United States Patent [19]

duPont

[11] Patent Number: 4,934,719
[45] Date of Patent: Jun. 19, 1990

[54] WHEELED ATTACHMENT TO LAWN CHAIR

[76] Inventor: Emile M. duPont, 374 Tyrella Ave., Mountain View, Calif. 94043

[21] Appl. No.: 420,738

[22] Filed: Oct. 12, 1989

Related U.S. Application Data

[63] Continuation of Ser. No. 222,444, Jul. 21, 1988, abandoned.

[51] Int. Cl.$^5$ ............................................. B62B 1/04
[52] U.S. Cl. .................................. 280/47.131; 280/30; 280/47.24; 280/79.2; 280/767; 297/DIG. 4; 297/130
[58] Field of Search ................... 280/30, 47.24, 79.11, 280/79.2, 35, 767, 47.131, 47.331; 297/DIG. 4, 130, 133

[56] References Cited

U.S. PATENT DOCUMENTS

| | | | |
|---|---|---|---|
| 2,291,474 | 7/1942 | Kalmbach | 280/47.13 R |
| 2,670,969 | 3/1954 | Costikyan | 280/47.13 R |
| 3,802,524 | 4/1974 | Seidel | 297/DIG. 4 |
| 3,887,228 | 6/1975 | Ingerson | 297/DIG. 4 |
| 3,891,245 | 6/1975 | Elsas | 280/47.13 R |
| 4,369,982 | 1/1983 | Hein et al. | 280/47.13 R |
| 4,550,925 | 11/1985 | McDonough | 280/47.13 B |
| 4,575,113 | 3/1986 | Boudreau | 297/DIG. 4 |

Primary Examiner—Charles A. Marmor
Assistant Examiner—Eric Culbreth
Attorney, Agent, or Firm—Townsend and Townsend

[57] ABSTRACT

A lawn chair which has a wheeled attachment removably mounted thereon at the rear thereof so that the lawn chair can be rendered more mobile and can be especially used as a cart for hauling articles, such as beach equipment, ice chests, athletic gear and the like. The attachment has shaft structure with opposed ends provided with wheels for engaging the ground. The shaft structure is coupled to a lower bracket for attachment to the rear crosspiece of the lawn chair. A strap secured the lower bracket firmly to the upper crosspiece of the lawn chair by an upper bracket which fits over an upper crosspiece of the lawn chair. By cinching the strap, the strap is made taut or placed in tension, thereby removably attaching the lower bracket and the wheels to the lower crosspiece.

4 Claims, 1 Drawing Sheet

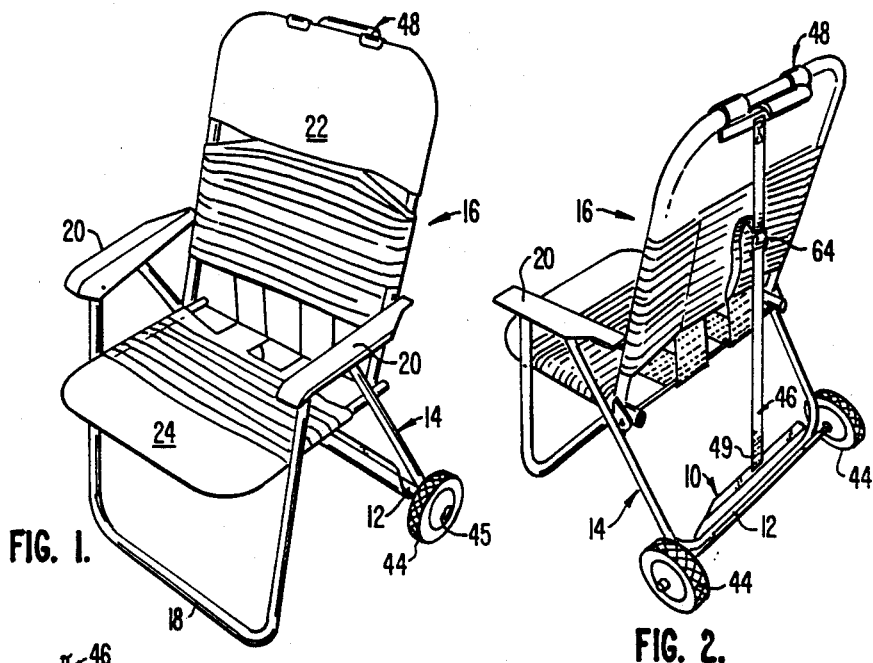
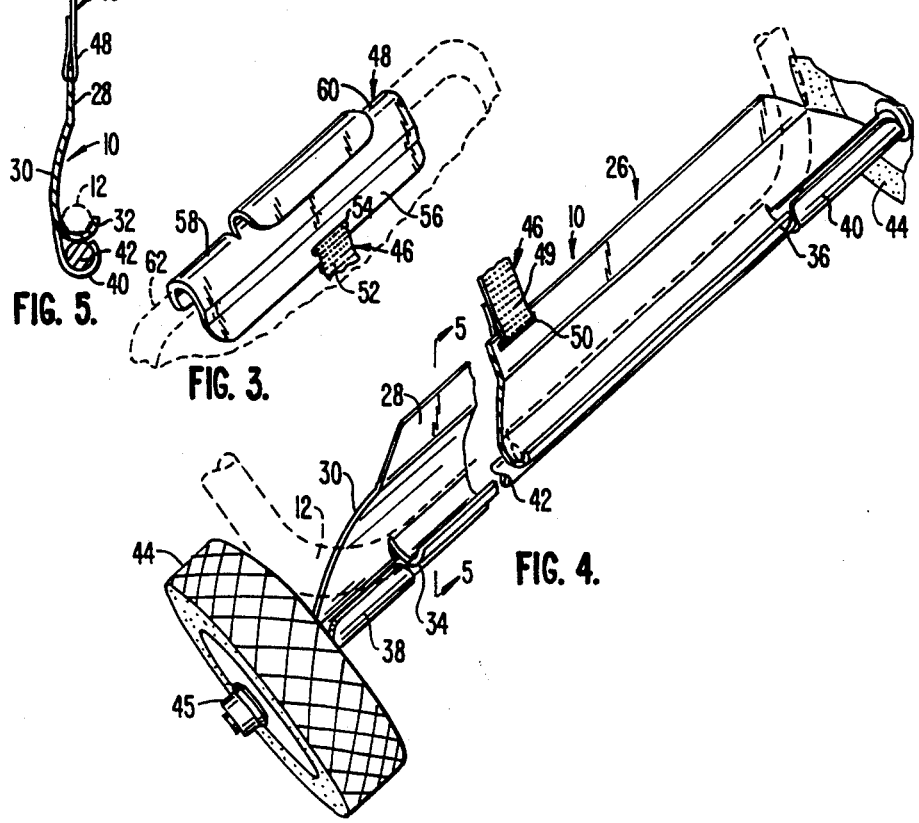

WHEELED ATTACHMENT TO LAWN CHAIR

This is a continuation of application Ser. No. 222,444, filed July 21, 1988, now abandoned.

BACKGROUND OF THE INVENTION

This invention relates to improvements in lawn chairs and, more particularly, to an attachment for a lawn chair to make it mobile.

Lawn chairs are well known and have been used in many different ways over the years. Such a lawn chair typically is made of a frame having a front, lower crosspiece and a rear, lower crosspiece, the crosspieces being engagable with the ground so that the seat or chair portion of the lawn chair will be at the proper height and will have the necessary stability to allow a person to sit comfortably in the chair.

Lawn chairs of the type described typically only are suitable for use as seats. The fact that the front and rear crosspieces are the only parts of a lawn chair which engages the ground and makes them clearly unsuitable for use as a cart for carrying objects, such as ice chests, clothing, swimming gear and the like from place to place. It is advantageous to be able to use a lawn chair of the type described for other purposes other than sitting. Thus, a need exists for improvements in lawn chairs of the type described and the present invention satisfies the need for providing an improvement for a lawn chair.

SUMMARY OF THE INVENTION

The present invention is directed to a lawn chair which has a wheeled attachment removably mounted thereon at the rear thereof so that the lawn chair can be rendered more mobile and can be especiallY used as a cart for hauling articles, such as beach equipment, ice chests, athletic gear and the like. To this end, the attachment of the present invention has shaft structure with opposed ends provided with wheels for engaging the ground. The shaft structure is coupled to a lower bracket for attachment to a rear crosspiece of the lawn chair. A strap or tie down device secures the lower bracket firmly to the upper crosspiece of the lawn chair by means of an upper bracket which fits over an upper crosspiece of the lawn chair. By cinching the strap, the strap is made taut or placed in tension, thereby biasing the brackets toward each other and thereby removably attaching the lower bracket and the wheels to the lower crosspiece.

The primary object of the present invention is to provide a wheelchair attachment for a lawn chair so as to render the lawn chair more mobile and suitable for use as a cart for hauling objects from one location to another location.

Another object of the present invention is to provide a lawn chair with an attachment of the type described wherein the attachment is removably secured in place against a lower crosspiece of the lawn chair to thereby render the wheel chair more mobile and especially suitable for use as a cart.

Other objects of this invention will become apparent as the following specification progresses, reference being had to the accompanying drawings for an illustration of the invention.

BRIEF DESCRIPTION OF THE DRAWINGS

FIG. 1 is a perspective view of the front of a lawn chair having the wheeled attachment of the present invention thereon;

FIG. 2 is a view similar to FIG. 1 but showing the back of the chair with the attachment on the rear, lower crosspiece of the lawn chair;

FIG. 3 is a perspective view of an upper part of the attachment, the lawn chair being shown partially in dashed lines;

FIG. 4. is an enlarged, perspective, fragmentary view, partly in section, of the attachment on the rear lower crosspiece; and FIG. 5 is a cross-sectional view taken along line 5—5 of FIG. 4.

The wheeled attachment for a lawn chair of the present invention is broadly denoted by the numeral 10 and is adapted to be placed on the rear, lower crosspiece 12 of the frame 14 of a lawn chair 16 shown in FIGS. 1 and 2. Lawn chair 16 is of a conventional construction and has a front, lower crosspiece 18 which is to typically generally parallel with rear, lawn crosspiece 12, Yet the lawn chair is collapsible or foldable into a compact configuration in which it is easier to move the chair from one place to another. Wheeled attachment 10 provides a mobility to the lower chair 16 which allows it to remain on the ground and to be wheeled from place to place. Moreover, by placing the wheeled attachment 10 at the rear of the frame 14 of chair 16, the chair can be used as a cart when it is tilted rearwardly and then moved forwardly or rearwardly as the case may be. In use as a cart, the chair is tilted rearwardly to present a recess or boxlike space between the side arm rests 20 and between the back 22 and the front seat portion 24.

Typically, frame 14 of chair 16 is made from light weight aluminum tube stock, such that rear crosspiece 12 is generally rigid and strong enough to be coupled to attachment 10 without being collapsed.

Wheeled attachment 10 includes a lower bracket 26 which is formed of a rigid, preferably metallic material, such as steel or the like. However, it could be made of plastic if strong enough, to carry out the teachings of the present invention.

Bracket 26 has a length substantially equal to or slightly greater than the length of crosspiece 12 as shown in FIG. 4. The bracket 26 further has an upper, substantially flat segment 28 integral with a curved segment 30 (FIG. 5) which is formed or shaped to present a first, open top hook-shaped segment 32 extending longitudinally of the bracket from a location 34 on bracket 26 (FIG. 4) to a location 36 near the opposite end of crosspiece 12.

A pair of second open top, end hook-shaped segments 38 and 40 are located near respective ends of the bracket 26 and are adapted to receive adjacent portions of a shaft 42 which extends through segments 38 and 40 and beneath segment 32. Shaft 42 is press fitted into the hook shaped segments 38 and 40 so that the shaft becomes connected to the bracket and extends along the normally lower-most extremity of the bracket beneath segment 32 by virtue of the capturing of the end portions of the shaft 42 in segments 38 and 40. It is to be understood, therefore, that segments 38 and 40 provide mounts for shaft 42 which rigidly secure the shaft to the bracket 26. If desired, the shaft 42 could be made to rotate in segments 38 and 40.

A pair of wheels 44 are secured in any suitable manner to the ends of shaft 42 for rotation relative to bracket 26. In one embodiment, the wheels could be rotatable relative to shaft 42, in which case, the shaft could be rigidly coupled to segments 38 and 40. In another embodiment, the wheels could be rigid to the ends of shaft 42, and the shaft would be rotatable in segments 38 and 40. For purposes of illustration, it is assumed that wheels 44 will be rotatable on shaft 42 so that the shaft can be press fitted and thereby be coupled to segments 38 and 40 as shown in FIGS. 4 and 5. In such a case, the shaft can extend through each wheel for rotation relative thereto and the shaft can be coupled to each wheel, such as by a threaded nut 45. A cotter pin could also be used in place of nut 45 to hold the shaft to each wheel. The length of bracket 26 in the area of the segments 38 and 40 is such that wheels 44 will not be interfered with by adjacent portions of frame 14 of chair 16.

A strap 46 and a second bracket 48 are used to couple bracket 26 onto crosspiece 12. To this end, the lower end of strap 46 is doubled upon itself and stitched or otherwise secured, such as by rivets or the like, so as to anchor the lower portion 49 of strap 42. The strap passes through a slot 50 in upper segment 28 of bracket 26 as shown in FIG. 4.

The upper end 52 of strap 46 passes through slot 54 in second bracket 48, the latter having a lower portion 56 and a pair of end segments 58 and 60 which are shaped like inverted hook members which fit over the upper crosspiece 62 of frame 14 of chair 16. The strap is provided with a buckle 64 (FIG. 2) or take-up device for making the strap taut as shown in FIG. 4 to thereby secure the ends of the strap to the buckle.

In use, attachment 10 will normally be separated from crosspiece 12 of chair 16, and strap 46 will ordinarily be wrapped around bracket 26 for simplifying the storage of attachment 10.

When it is desired to place the attachment 10 on chair 16 to render the chair suitable for use in carrying cartons or other articles, bracket 26 is manipulated until the lower portion of crosspiece 12 of chair 16 is received in hook-shaped segment 32 as shown in FIGS. 4 and 5. To hold the bracket 26 on crosspiece 12 temporarily, the user pulls upwardly on strap 46 until bracket segments 58 and 60 are placed over the upper crosspiece 26 of chair 16. During this time, strap 46 will typically be slack or loose, following which the ends of the strap will be manipulated so that buckle 64 will move in a sense to render strap 46 taut. When so taut, the strap holds both brackets 26 and 48 in place, tending to pull the brackets together by virtue of the tension on the strap. When so placed on chair 16, attachment 10 allows the chair to be tilted rearwardly to present a storage space between arm rests 20 of the chair for receiving boxes, packages or the objects for transporting the or objects from one place to another. Typically, the chair will be pulled rearwardly since it is much simpler to pull the chair by virtue of the positions of the wheels 44 than it is to push the chair forwardly.

When it is desired to remove the attachment 10 from the chair, strap 46 is loosened, allowing bracket 48 to be removed from upper crosspiece 62. This allows the bracket 26 to be separated from lower crosspiece 12. The attachment is then stored and is ready for use again.

The present invention, therefore, provides an attachment which is simple and rugged in construction and which is easy to install or take off a chair having a lower crosspiece. The attachment could conceivably be removably coupled to front, lower crosspiece 18 with the strap being coupled in some suitable manner to the chair, such as to seat portion 24 thereof. However, attachment 10 is especially suitable for attachment to the rear crosspiece 12 and it is more suitably used at the rear of the chair rather than at the front thereof.

I claim:

1. An attachment for a lawn chair having an elongated rear, upper crosspiece and an elongated rear, lower crosspiece comprising:
   a first bracket having a shaft thereon with a pair of wheels coupled to respective ends of the shaft, there being first elongated recess means on the first bracket and parallel with the axis of the shaft for receiving at least the lower portion of the lower crosspiece of the chair, there being a second bracket having a recess for receiving the upper crosspiece, said first bracket having second elongated recess means parallel with and vertically aligned with the first recess means for mounting the shaft thereon; and
   strap means coupled with each bracket and vertically alignable with the first recess means and said second recess means for urging the first bracket toward the second bracket.

2. An attachment as set forth in claim 1, wherein the first elongated recess means is transversely hook-shaped.

3. In combination:
   a lawn chair having an elongated rear, upper crosspiece and an elongated rear, lower crosspiece; and
   a wheeled attachment removably mounted on the lawn chair, said attachment including: a first bracket having a shaft thereon with a pair of wheels coupled to respective ends of the shaft, there being first elongated recess means on the first bracket and parallel with the axis of the shaft for receiving at least the lower portion of the lower crosspiece of the chair, there being a second bracket having a recess means for receiving the upper crosspiece, said first bracket having second elongated recess means parallel with and vertically aligned with the first recess means for mounting the shaft thereon and strap means coupled with each bracket and vertically alignable with the first recess means and said second recess means for biasing the first bracket toward the second bracket.

4. The combination as set forth in claim 3 wherein the first elongated recess means is transversely hook-shaped.

* * * * *